United States Patent [19]

Evani et al.

[11] Patent Number: 4,921,902

[45] Date of Patent: May 1, 1990

[54] HYDROPHOBIE ASSOCIATIVE COMPOSITION CONTAINING A POLYMER OF A WATER-SOLUBLE MONOMER AND AN AMPHIPHILIC MONOMER

[75] Inventors: Syamalarao Evani; K. Van Phung, both of Midland, Mich.

[73] Assignee: The Dow Chemical Company, Midland, Mich.

[21] Appl. No.: 576,250

[22] Filed: Feb. 2, 1984

[51] Int. Cl.$^5$ .................................. C08F 220/56
[52] U.S. Cl. ..................... 524/555; 526/304; 526/307.6; 526/307.7; 526/320; 526/317.5
[58] Field of Search .................. 526/304, 307.6, 307.7, 526/320; 524/555, 456

[56] References Cited

U.S. PATENT DOCUMENTS

| | | | |
|---|---|---|---|
| 3,201,304 | 8/1965 | Munjat | 162/168 |
| 3,277,157 | 10/1966 | Stewart et al. | 260/486 |
| 3,707,466 | 12/1972 | Reinwald et al. | 210/52 |
| 3,896,161 | 7/1975 | Borden et al. | 260/486 R |
| 4,134,916 | 1/1979 | Moss et al. | 260/561 N |
| 4,239,671 | 12/1980 | Fink et al. | 526/304 |
| 4,421,902 | 12/1983 | Chang et al. | 526/320 |
| 4,430,481 | 2/1984 | Hunter | 526/304 |
| 4,439,334 | 3/1984 | Borchardt | 526/304 |
| 4,463,152 | 7/1984 | Schulz et al. | 526/307.5 |

*Primary Examiner*—Joseph L. Schofer
*Assistant Examiner*—Jeffrey T. Smith

[57] ABSTRACT

A hydrophobe associative composition of an ethylenically unsaturated, water-soluble monomer such as acrylamide and an ethylenically unsaturated amphiphilic monomer such as dodecyl poly(oxyethylene)$_{10}$ methacrylate which is particularly effective for increasing the viscosity of brines or other aqueous media contaning salts or other electrolytes. Such copolymers are therefor useful in mobility control fluids and fracturing fluids for enhanced oil recovery and as drag reduction agents.

14 Claims, No Drawings

HYDROPHOBIE ASSOCIATIVE COMPOSITION CONTAINING A POLYMER OF A WATER-SOLUBLE MONOMER AND AN AMPHIPHILIC MONOMER

BACKGROUND OF THE INVENTION

This invention relates to hydrophobic associative compositions that increase the viscosity of aqueous media containing water-soluble electrolytes.

As taught in *Encyclopedia of Polymer Science and Technology*, Interscience Publishers, Vol. I, 192 (1964), it is known that the viscosity of an aqueous medium is increased by the addition of a water-soluble polymer. Such water-soluble polymers include polyacrylamide, acrylamide/acrylic acid copolymer, sodium polyacrylate, carboxymethyl cellulose, hydroxyethyl cellulose, methyl cellulose, polysaccharide as well as naturally occurring gums such as guar gum and chemically modified gums such as hydroxypropyl guar gum. As a result of this thickening capability, there are many existing, as well as potential, industrial applications for aqueous media thickened with such water-swellable polymers.

Unfortunately, however, the aforementioned conventional water-soluble polymers suffer from many serious deficiencies or limitations in actual use in such industrial applications. For example, for reasons of efficiency and economical considerations, it is common to employ very high molecular weight versions of such polymers. However, during many industrial applications, the conditions present during the practice of the application involve exposing an aqueous medium containing the high molecular weight water-soluble polymer to high shear. Such shear often causes mechanical degradation of the polymer and thus reduces the viscosity of the aqueous medium. While lower molecular weight polymers are less sensitive to shear degradation, they must be used in much higher concentrations in order to achieve the desired level of viscosity.

Secondly, while ionic water-soluble polymers such as neutralized acrylamide/acrylic acid copolymer, sodium polyacrylate, polystyrene sulfonate and the like are more efficient thickeners in deionized water than their nonionic counterparts, their thickening ability is greatly reduced by the presence of water-soluble electrolytes such as sodium chloride, calcium chloride and magnesium sulfate in the aqueous medium. Such electrolytes are present in the aqueous media employed in most industrial applications, particularly those requiring the use of ground waters in subterranean formations as in enhanced oil recovery.

Finally, in many applications, the aqueous medium thickened with water-soluble polymer is exposed to temperatures in the range of 30° C. to 100° C. which normally causes reduction of viscosity. Such high temperatures are particularly common in enhanced oil recovery applications wherein the aqueous medium is pumped underground to depths of 5000 to 20,000 feet, as is common for mobility control fluids and packing fluids.

In attempts to overcome some of the aforementioned deficiencies of the conventional water-soluble polymers, it has been a common practice to cross-link the polymer in order to improve resistances to thermal as well as shear degradation. See, for example, U.S. Pat. No. 3,247,171. Such attempts have generally not been successful. More recently, as taught in U.S. Pat. No. 3,984,333, an aqueous medium has been thickened by dissolving a block copolymer having water-soluble blocks and water-insoluble blocks in the aqueous medium. While such block copolymers apparently exhibit reasonably good resistance to shear degradation, such polymers are difficult and often impractical to prepare. More importantly, such polymers do not exhibit significant tolerance of electrolytes normally present in the aqueous media to be thickened.

While the cellulosic derivatives such as hydroxyethyl cellulose and biopolymers exhibit acceptable tolerance to the presence of electrolytes, cellulosic derivatives are generally ineffective at the low concentrations that are economical and exhibit poor thermal stability. The biopolymers such as xantham gums exhibit acceptable thermal stability, resistance to shear degradation and electrolytic tolerance. Unfortunately, such biopolymers are generally very expensive and are susceptible to biodegradation.

In view of the aforementioned deficiencies of conventional water-soluble polymers, it is highly desirable to provide a relatively inexpensive polymer composition capable of increasing the viscosity of aqueous media containing water-soluble electrolytes. It is also desirable that such polymer exhibits thermal stability, electrolytic tolerance and good resistance to shear and biological degradation.

SUMMARY OF THE INVENTION

The present invention is an aqueous-soluble hydrophobe associative copolymer of an ethylenically unsaturated, water-soluble monomer and an ethylenically unsaturated, amphiphilic monomer having hydrophobic moieties that are capable of associating with each other in an aqueous medium containing a water-soluble electrolyte. Surprisingly, aqueous media containing the hydrophobic associative copolymer of this invention can be subjected to substantial mechanical shear without a significant loss of viscosity. This increase in viscosity is particularly enhanced by the presence of a water-soluble electrolyte in the aqueous medium being thickened. Moreover, such hydrophobic associative copolymers provide a substantial viscosity increase even when the aqueous medium is exposed to temperatures up to 80° C. and higher. Consequently, such copolymers can be used for a variety of applications wherein high temperatures, substantial electrolyte concentrations and conditions of high mechanical shear such as in high shear pumping of the aqueous medium are required.

Unlike high molecular weight polymers currently available which thicken an aqueous media but which also give solutions which are stringy, the copolymers of the invention when dispersed in an aqueous medium, exhibit suitable plastic rheology and short solution characteristics. By "short solution characteristics" is meant that an aqueous medium containing the hydrophobic associative copolymer does not produce threads or strings of such aqueous medium when surfaces wetted with the medium are contacted and pulled apart.

As a result of these and other thickening characteristics of the present invention, these copolymers are useful in all applications which require aqueous media having increased viscosity such as drilling mud formulations, fracturing fluids, liquid mobility control agents, aqueous solutions of inorganic salts, hydraulic fluids, lubricants, friction reducing agents, suspending agents, aqueous suspensions of insoluble particulates such as paint formulations and the like.

DETAILED DESCRIPTION OF THE ILLUSTRATIVE EMBODIMENTS

The hydrophobe associative copolymer of this invention is aqueous-soluble, i.e., it is soluble in an aqueous medium consisting of water and 0.2 weight percent of sodium chloride. For the purposes of this invention, a hydrophobe associative copolymer is soluble in the aforementioned aqueous medium if 0.5 weight parts of the copolymer forms a thermodynamically stable solution when it is intimately mixed with 100 weight parts of the aqueous medium. Such solutions form spontaneously in the aqueous medium and include (1) true solutions in which the individual polymer molecules are dispersed as well as (2) micellular or colloidal solutions wherein the polymer molecules are aggregated to some extent, but wherein such aggregates are no larger than colloidal size.

By "hydrophobe associative" is meant that, in aqueous media, the hydrophobic moieties of the copolymer associate thereby increasing the viscosity of the aqueous medium. Additionally, it is observed that this property of hydrophobe association is even further enhanced by the addition of a water-soluble electrolyte to the aqueous medium. This further enhancement (increase) of viscosity resulting from the addition of the electrolyte occurs in absence of any precipitation or phase separation. In fact, the occurrence of such precipitation or phase separation upon addition of the electrolyte is not desirable in the practice of this invention.

The copolymer is predominantly hydrophilic, but contains a sufficient concentration of suitable hydrophobic moieties to enable it to associate with the hydrophobic moieties of other molecules of the copolymer in an aqueous medium and thus cause an increase in viscosity of the aqueous medium. The molecular weight of the copolymer is low enough such that an aqueous medium containing 0.1 weight percent of the copolymer can be subjected to a degree of shear on the order of 10,000 sec$^{-1}$ without causing the copolymer to degrade significantly. Moreover, the copolymer has a molecular weight such that, when 0.5 weight part of the copolymer is dissolved in 100 weight parts of water, the Brookfield viscosity of the water is increased to at least 2 centipoises (as measured using a Brookfield LVT viscometer equipped with a UL adaptor and operated at 6 rpm and 25° C.). While copolymers having very high molecular weight, e.g., weight average molecular weight ($M_w$) greater than 5 million, can be suitably employed, such copolymers tend to degrade when subjected to high shear, e.g., in excess of 10,000 sec$^{-1}$. Accordingly such copolymers are less preferred for some applications. Preferably, the copolymers of this invention have weight average molecular weights ($M_w$) as determined by the intrinsic viscosity method described in the examples in the range from about 200,000 to about 5 million, most preferably from about 800,000 to about 2.5 million.

The hydrophobic groups of the hydrophobe associative copolymer are preferably pendant organic groups having hydrophobicities comparable to one of the following: aliphatic hydrocarbon groups having at least four carbons such as $C_4$ to $C_{20}$ alkyls and cycloalkyls; polynuclear aromatic hydrocarbon groups such as naphthyls; alkylaryls wherein alkyl has one or more carbons, preferably 4 to 8 carbons; haloalkyls of 4 or more carbons, preferably perfluoroalkyls; polyalkyleneoxy groups wherein alkylene is propylene or higher alkylene and there is at least 1 alkyleneoxy unit per hydrophobic moiety. The concentration of hydrophobic moieties in the hydrophobe associative copolymer is that which is sufficient to increase the viscosity of an aqueous medium containing an electrolyte such as sodium chloride in concentration as low as 0.1 weight percent. Preferably, the concentration of hydrophobic groups in the copolymer is such that, when 0.5 weight part of the copolymer is dissolved in 100 weight parts of the aqueous medium containing at least one weight percent of sodium chloride, the Brookfield viscosity (as defined hereinbefore) of the aqueous medium is substantially higher than, e.g., at least twice, that of a similar aqueous medium except that the copolymer is identical in all respects to the hydrophobe associative copolymer except that it contains no hydrophobic groups. For example, if an aqueous solution containing one weight percent of sodium chloride and one weight percent of polyacrylamide (hydrophilic polymer) has a Brookfield viscosity of 10 cps, the aqueous solution containing one weight percent of sodium chloride and one weight percent of a suitable hydrophobe associative polyacrylamide, e.g., an acrylamide/dodecyl poly(oxyethylene)$_{10}$ methacrylate copolymer having a $M_w$ equivalent to the polyacrylamide, will have a Brookfield viscosity of at least 20 cps.

The hydrophobe associative copolymer is preferably an addition copolymer of a water-soluble ethylenically unsaturated monomer and an amphiphilic ethylenically unsaturated monomer having sufficient concentration of hydrophobic groups to enable the copolymer to associate with the hydrophobic groups of other molecules of the copolymer and sufficient concentration of nonionic, hydrophilic groups to enable the copolymer to control its hydrophilic-lyophilic balance. Thus, in the absence of electrolyte, the nonionic, hydrophilic groups of the amphiphilic monomeric portion of the copolymer are hydrated when the copolymer is dispersed in an aqueous medium. However, when electrolyte is then added to the aqueous medium, the hydrophilic groups of the amphiphilic monomer dehydrate and become hydrophobic.

Exemplary preferred polymers include copolymers of from about 90 to about 99.995, more preferably from about 98 to about 99.9, most preferably from about 99 to 99.5, mole percent of one or more water-soluble monomers with from about 0.005 to about 10, more preferably from about 0.1 to 2, most preferably from 0.5 to about 1, mole percent of one or more amphiphilic monomers. For these copolymers, it is found that preferred amounts of amphiphilic monomer will vary with the molecular weight of the copolymer. For example, a hydrophobe associative copolymer having a weight average molecular weight near 200,000, preferably contains from about 1 to about 2 mole percent of the amphiphilic monomer. Alternatively, the copolymer having a weight average molecular weight of 2 million preferably contains from about 0.02 to about 0.1 mole percent of amphiphilic monomer, preferably from about 0.05 to about 0.1 mole percent. Also, the preferred percentage of amphiphilic monomer varies with the relative balance of hydrophilic moiety versus the hydrophobic moiety in the amphiphilic monomer. For example, as the balance shifts from hydrophilic to hydrophobic generally less amphiphilic monomer is employed. Conversely, if this balance shifts to more hydrophilic, then more of the amphiphilic monomer is required.

Suitable water-soluble monomers include those which are sufficiently water-soluble to form at least a 10 weight percent solution when dissolved in water and readily undergo addition polymerization to form polymers which are water-soluble. Exemplary water-soluble monomers include ethylenically unsaturated amides such as acrylamide, methacrylamide and fumaramide and their N-substituted derivatives such as 2-acrylamido-2-methylpropane sulfonic acid (AMPS), N-(dimethylaminomethyl)acrylamide as well as N-(trimethylammoniummethyl)acrylamide chloride and N-(trimethylammoniumpropyl)methacrylamide chloride; ethylenically unsaturated carboxylic acids such as acrylic acid, methacrylic acid, itaconic acid and fumaric acid; and other ethylenically unsaturated quaternary ammonium compounds such as vinylbenzyl trimethyl ammonium chloride, sulfoalkyl esters of unsaturated carboxylic acids such as 2-sulfoethyl methacrylate, aminoalkyl esters of unsaturated carboxylic acids such as 2-aminoethyl methacrylate, vinyl amines such as vinyl pyridine and vinyl morpholine, diallyl amines and diallyl ammonium compounds such as diallyl dimethyl ammonium chloride, vinyl heterocyclic amides such as vinyl pyrrolidone, vinylaryl sulfonates such as vinylbenzyl sulfonate as well as the salts of the foregoing monomers. Of the foregoing water-soluble monomers, acrylamide and combinations of acrylamide and acrylic acid, including salts of acrylic acid such as sodium acrylate or ammonium acrylate, are preferred. Acrylamide and combinations thereof with up to 75 mole percent of acrylic acid or salt thereof, based on total water-soluble monomer, are more preferred. Most preferred are polymers wherein the water-soluble monomer is a mixture of acrylamide with from about 5 to about 50 mole percent, especially from about 5 to about 30 mole percent of acrylic acid or salt thereof.

Suitable amphiphilic monomers include those which are (1) usually soluble in water at room temperature, but are water-insoluble at the temperature used to copolymerize the amphiphilic monomer with water-soluble monomer, e.g., about 60° C., and (2) ethylenically unsaturated compounds having hydrophobic groups and hydrophilic groups as defined hereinbefore. Preferred amphiphilic monomers include the higher alkyl (polyoxyethylene)$_x$ esters of $\alpha,\beta$-ethylenically unsaturated carboxylic acids wherein x is a number from 2 to 40, most preferably from 5 to 40, and the higher alkyl has from 6 to 20 carbons, most preferably from 8 to 16. Examples of such esters include dodecyl poly(oxyethylene)$_{10}$ methacrylate, dodecyl poly(oxyethylene)$_{20}$ methacrylate, dodecyl poly(oxyethylene)$_{12}$ acrylate, tridecyl poly(oxyethylene)$_{14}$ methacrylate, tetradecyl poly(oxyethylene)$_{16}$ acrylate, bis[octadecyl poly(oxyethylene)$_{12}$] itaconate, bis[hexadecyl poly(oxyethylene)$_{17}$] maleate, and other higher alkyl poly(oxyethylene) esters of acrylic acid, methacrylic acid, maleic anhydride, fumaric acid, itaconic acid and aconitic acid. Suitable amphiphilic monomers include alkylaryl poly(oxyethylene)$_x$ esters of the aforementioned unsaturated acids, especially those wherein alkyl has from 7 to 10 carbons and x is as defined before. Examples of such alkylaryl esters include nonyl-$\alpha$-phenyl poly(oxyethylene)$_{10}$ acrylate, nonyl-$\alpha$-phenyl poly(oxyethylene)$_{12}$ methacrylate, dodecyl-$\alpha$-phenyl poly(oxyethylene)$_{20}$ methacrylate, and the like. Other suitable amphiphilic monomers include higher alkyl copoly(oxyethylene/oxypropylene) esters of the aforementioned acids, N-(higher alkyl poly(oxyethylene)) acrylamides and methacrylamides, N-(higher alkyl copoly(oxyethylene/oxypropylene)) acrylamides and methacrylamides and the like. Of the preferred higher alkyl poly(oxyethylene)$_x$ esters, most preferred are those wherein alkyl has from 8 to 16 carbons, x is 5 to 40, and the acid portion is acrylate or methacrylate, e.g., dodecyl poly(oxyethylene)$_{10}$ methacrylate, dodecyl poly(oxyethylene)$_{20}$ methacrylate, and similar acrylate esters. In applications wherein hydrolysis is a problem such as floods, N-(higher alkyl copoly(oxyethylene/oxypropylene) acrylamides are the most preferred amphiphilic monomers.

The aforementioned hydrophobe associative copolymers are advantageously prepared by copolymerizing the water-soluble monomers with amphiphilic monomers in an aqueous medium containing a chelating agent that complexes with any existing polymerization inhibitors and an emulsifier that solubilizes the amphiphilic monomer in the aqueous medium. The polymerization techniques are typically those wherein the amphiphilic monomer or mixture of amphiphilic monomers is added with vigorous agitation to an aqueous solution of the water-soluble monomer or mixture of water-soluble monomers and solubilizing emulsifier. By solubilizing the amphiphilic monomer in the aqueous medium, it is meant the combination of aqueous medium, amphiphilic monomer and emulsifier gives the visual appearance of a clear solution, preferably, the "solvated" particles of monomer are less than 200 Angstrom units. A chelating agent such as ethylenediamine tetraacetic acid (EDTA), the pentasodium salt of (carboxymethylimino)bis(ethylenenitrilo)tetraacetic acid, tetrasodium ethylenedinitrilotetraacetate or the trisodium salt of N-(carboxymethyl)-N'-(2-hydroxyethyl)-N,N'-ethylenediglycine is then added to the reaction mixture to complex metallic salts which are often present in water-soluble monomers such as acrylamide. The copolymerization is then preferably initiated by adding a polymerization initiator capable of generating free-radicals. Optionally, a chain transfer agent may be included in the polymerization reaction mixture.

The solubilizing emulsifier is required in most instances to suitably solubilize the amphiphilic monomer and to subsequently obtain a hydrophobe associative copolymer having a desirable concentration of hydrophobic moieties in the copolymer. It is believed that the amphiphilic monomer is solubilized in the micelles formed by the emulsifier. Thus, the emulsifier is generally employed in an amount which is above the critical micelle concentration (CMC) of the emulsifier, but less than that which reduces the concentration of amphiphilic monomer in the copolymer to a point that the hydrophobic groups of the copolymer will not associate in the presence of the electrolyte. Preferably, the concentration of emulsifier in the aqueous polymerization medium is from about 2 to about 4 times the CMC of the emulsifier. The amount of emulsifier used will also be such that there is at least one amphiphilic monomer molecule per micelle of the emulsifier, preferably from about 1 to about 10, most preferably from about 2 to about 5, amphiphilic monomer molecules per micelle. For example, when sodium dodecyl sulfate (NaDS) is employed as an emulsifier for dodecyl poly(oxyethylene)$_{10}$ methacrylate (DPMA), the molar ratio of DPMA to NaDS is at least 1:50 up to about 1:2, preferably from 1:5 to 1:25, most preferably about 1:10 to about 1:15. By knowing the CMC, the hydrophilic-lipophilic balances (HLB) and aggregation number of molecules in the micelle molecular weight of an emulsifier and the hydrophobicity of the amphiphilic monomer, suitable molar ratios and appropriate emulsifier concentrations can be determined for any given amphiphilic monomer and emulsifier to provide similar suitable concentrations of hydrophobic moieties in the hydrophobe associative copolymer. In general mole ratios which will provide from about 2 to about 10, preferably about 4 to 5, molecules of the amphiphilic monomer per micelle of emulsifier are selected.

Suitable emulsifiers include anionic agents such as alkali metal salts of alkyl sulfates and alkyl and aryl sulfates, e.g., dodecyl alkyl sulfosuccinates and sodium dodecylbenzene sulfate; fatty acid soaps, e.g., sodium oleate, sodium stearate and potassium oleate; alkali metal salts of sulfonated fatty alcohols, e.g., sodium dodecyl sulfate; sulfates of ethoxylated alcohols; alkyl phosphate esters, e.g., dodecyl hydrogen phosphate; fluoro emulsifiers, e.g., perfluoroalkyl sulfates; and the like. Also included are cationic emulsifiers such as alkylamine hydrochlorides, e.g., dodecylamine hydrochloride and tridecylamine hydrochloride; quaternary alkyl or aryl ammonium halides such as dodecyl trimethyl ammonium chloride; ethoxylated fatty amines and other emulsifiers as described in *McCutcheon's Detergents and Emulsifiers*, North American Edition, 1980 Annual. In general, when the hydrophilic/hydrophobic polymer is anionic or nonionic, an anionic emulsifier such as an alkali metal alkyl sulfate is preferably employed as the emulsifier. When the hydrophobe associative copolymer is cationic, a cationic emulsifier such as dodecylamine hydrochloride is employed. When the hydrophobe associative copolymer is nonionic, anionic or cationic, a nonionic emulsifier such as nonylphenoxy polyethylene glycol having 10 ethyleneoxy units per molecule or other water-dispersible nonionic surfactants as defined herein is suitably employed.

Suitable chelating agents include those mentioned hereinbefore, with the pentasodium salt of (carboxymethylimino)bis(ethylenenitrilo)tetraacetic acid being preferred. When employed, the chelating agent is used in an amount in the range from about 0.1 to about 0.2, preferably from about 0.1 to about 0.15, weight percent based on the weight of total monomers.

Exemplary suitable polymerization initiators include the inorganic persulfates such as potassium persulfate, ammonium persulfate and sodium persulfate, azo catalysts such as azobisisobutyronitrile and dimethyl azoisobutyrate; organic peroxygen compounds such as benzyl peroxide, t-butyl peroxide, diisopropyl benzene hydroperoxide and t-butyl hydroperoxide. Of these initiators, the oil-soluble types such as the organic peroxides and azo compounds are preferred. It is desirable to employ from about 0.01 to about 0.1 weight percent of initiator based on the weight of total monomers.

The hydrophobe associative copolymers are readily recovered from the aqueous medium when such is desired by removal of water under vacuum or by azeotropic distillation or by drum drying. Alternatively, the aqueous medium containing the hydrophobe associative copolymer can be used as such.

It is also understood that hydrophobe associative copolymers of acrylamide, acrylic acid and amphiphilic monomer can be prepared by copolymerizing all three of these monomers or by copolymerizing acrylamide with the amphiphilic monomer and subsequently hydrolyzing a portion of the copolymerized acrylamide by contacting the copolymer with a base such as sodium hydroxide and/or sodium carbonate.

The amount of hydrophobe associative copolymer in the aqueous medium being used is sufficient to provide the desired increase in viscosity of the aqueous medium. Preferably, such amounts of copolymer range from about 0.01 to about 1.5 weight percent, most preferably from about 0.05 to about 1 weight percent, based on the aqueous medium.

In addition to the hydrophobe associative copolymer, the aqueous medium may also contain a non-polymeric, water-soluble electrolyte including salts of monovalent and divalent cations such as ammonium, alkali metal and alkaline earth metal chlorides, bromides, nitrates, sulfates, carbonates, acetates and the like; monobasic and di- and tribasic acids such as hydrochloric acid, sulfuric acid, phosphoric acid and oxalic acid; and monovalent bases such as sodium hydroxide and potassium hydroxide. Such electrolytes may be present in the aqueous media as in the case of brines and other aqueous media containing water-soluble salts of various metals and other water-soluble electrolytes. Such aqueous media often contain from about 0.01 to about 20 weight percent of salts of alkali metals and alkaline earth metals. These electrolytes generally enhance hydrophobe association between hydrophobic groups and the hydrophobe associative copolymer.

In addition to the hydrophobe associative copolymer and electrolyte (salt), the aqueous medium may contain a variety of other ingredients common to mobility control fluids, fracturing fluids, drilling muds, or other additives depending upon the intended use of the aqueous medium. The aqueous medium may also contain various additives such as antioxidants and antimicrobials, stabilizers, fillers and the like.

An exemplary fracturing fluid comprises the aforementioned hydrophobe associative copolymer, a stabilizer (antioxidant) such as a water-soluble thiosulfate; a fluid loss additive such as silica flour or a liquid hydrocarbon; a particulate solid proppant such as sand, bauxite, glass beads; and an energizing gas such as nitrogen or carbon dioxide. In each instance, the proportions of ingredients are the proportions employed in conventional fracturing fluids.

To increase the viscosity of an aqueous medium containing substantial amounts, e.g., up to about 5 weight percent based on the aqueous medium, of monovalent inorganic salts such as sodium chloride and up to 1 weight percent, usually from 0.0015 to 0.5 weight percent, of salts of polyvalent cations such as calcium and magnesium, it is preferred to employ (1) as the hydrophobe associative copolymer, (a) a nonionic copolymer of a water-soluble ethylenically unsaturated carboxamide such as acrylamide and a higher alkyl poly(oxyethylene)$_x$ acrylate or methacrylate such as dodecyl poly(oxyethylene)$_{10}$ methacrylate or (b) an anionic copolymer of sodium acrylate and a higher alkyl poly(oxyethylene)$_x$ acrylate or methacrylate wherein x is 5 to 40 and alkyl has from 8 to 16 carbon atoms. The viscosity increase in this aqueous medium is retained or increased at temperatures over the range from about 30° C. to about 80° C. In many instances, this viscosity increase is retained at temperatures substantially higher than 80° C. To increase the viscosity of an aqueous medium at a temperature of 60° C. to 80° C. and containing from about 10 to 15 weight percent of a monovalent salt, it is preferred to use one of the aforementioned or nonionic or anionic copolymers wherein x is 10 to 20, e.g., a dodecyl poly(oxyethylene)$_{10}$ methacrylate. In contrast, to increase the viscosity of an aqueous medium at an ambient temperature and containing from about 0.1 to about 0.5 weight percent of monovalent salt, it is preferred to employ one of the aforementioned nonionic or anionic copolymers wherein x is 6 to 12. To increase the viscosity of an aqueous medium containing from about 1 to about 5 weight percent of salts of polyvalent cations, e.g., calcium and/or magnesium in the form of salts such as calcium bromide, calcium chloride or magnesium sulfate, it is preferable to employ one of the aforementioned nonionic copolymers wherein x is 20 to 40, e.g., copolymer of acrylamide and dodecyl(polyoxyethylene)$_{20}$ methacrylate.

In general, the type of application and the conditions characteristic of the application will determine the number of carbons in the hydrophobic moiety and the value of x for the amphiphilic monomer employed, to give the desired viscosity response. For example, it is found that an amphiphilic monomer having a value of x of 5-10 and a $C_{12}$-$C_{16}$ alkyl group is advantageously employed in an aqueous medium having a relatively low salt concentration and moderate temperature. On the other hand, an amphiphilic monomer having an x value of 10-40 and $C_6$-$C_{10}$ alkyl as the hydrophobic group is employed in an aqueous medium having a relatively high salt concentration and high temperature. Moreover, the desired viscosity response for a given set of conditions can be achieved by using a single amphiphilic monomer or a mixture of amphiphilic monomers which combine to provide the desired properties.

The following examples are given to illustrate the invention and should not be construed as limiting its scope. Unless otherwise indicated, all parts and percentages are by weight.

I. GENERAL PROCEDURE FOR PREPARING THICKENING AGENT

A 300-ml citrate bottle is charged with ~25 ml of an aqueous solution containing sodium dodecyl sulfate, water-soluble monomer(s) and an amphiphilic monomer in amounts as specified in the examples hereinafter. The mixture is stirred to form a clear solution. Then, (1) 1.5 ml of a solution of 2 percent of the pentasodium salt of (carboxymethylimino)bis(ethylenenitrilo)tetraacetic acid (V-80) in water, and (2) 2.4 g of a solution of 1 percent of azobisisobutyronitrile (AZO) in t-butyl alcohol are added sequentially to the bottle and stirred for a few minutes. When specified, isopropyl alcohol (IPA) is then added as a chain transfer agent. The contents of the bottle are then increased to the specified weight by addition of deionized water and degassed by alternate cycles (5-10 cycles) of vacuum and nitrogen gas purge. The bottle is then capped and heated in a water bath at 60° C. for 16 hours in an end-over-end apparatus thereby effecting copolymerization of the monomers. Following polymerization, the contents of the bottles are cooled to room temperature and the agent is removed from the bottle as a thick aqueous solution (polymer gel).

For purposes of comparison, water-soluble polymers of the water-soluble monomers which polymers do not contain the amphiphilic monomer are prepared according to the foregoing procedure except that the amphiphilic monomer is omitted.

Each of the aforementioned compositions is diluted with deionized water to form a stirrable solution and stirred for 24 hours to obtain a uniform solution. The solution is then adjusted to pH of 7.5 with a 2 percent sodium hydroxide solution and then diluted with deionized water to polymer concentration as specified, usually about 0.5 percent. The solution is maintained at 23° C. for 3-4 hours to reach equilibrium.

The viscosity of the solution of the composition is measured using Haake Rotoviscometers or Brookfield LVT or RVT viscometers with appropriate spindle and rpm as specified.

A solution of each of the copolymers and a water-soluble electrolyte is prepared by dissolving a specified amount of sodium chloride or other electrolyte in the aforementioned composition solution and then maintaining the solution for 2-3 hours to allow it to reach equilibrium. The viscosity of the resulting solution is measured by a Brookfield or Haake viscometer as specified.

EXAMPLE 1

A. Preparation of Dodecyl Poly(oxyethylene)$_{10}$ Methacrylate

A 100-ml reaction flask equipped with nitrogen inlet and outlet, with glass bead filled column (12 inches), condenser and receiver is charged with 20 parts (32 mmoles) of dodecyl poly(oxyethylene)$_{10}$ methacrylate, 0.03 parts of phenothiazine, 30 parts (0.3 mole) of methyl methacrylate and 0.4 part of titanium (IV) isopropoxide. A slow stream of nitrogen is bubbled through the reaction mixture and heated to 105° C. for 6 hours. The unreacted methyl methacrylate is removed at 40° C./5-10 mm Hg. The amphiphilic monomer is 92 percent pure as determined by nuclear magnetic resonance.

B. Preparation of Dodecyl Poly(oxyethylene)$_{20}$ Methacrylate

Twenty parts of dodecyl poly(oxyethylene)$_{20}$ which is solid at room temperature is made a 50 percent solution in toluene. The solution is charged in the reaction flask as described before, together with 0.03 part of phenothiazine, 35 parts of methyl methacrylate and 0.5 part of titanium (IV) isopropoxide and heated at 103° C. for 7 hours. After using toluene as chaser to completely remove the unreacted methyl methacrylate, the neat product is determined by nuclear magnetic resonance to be 90 percent of the aforementined amphiphilic monomer.

Several hydrophobe associative copolymers (Agents A, B, C, D and E) are prepared according to the aforementioned general procedure using different polymerization formulations set forth in Table I. These copolymers are then tested for viscosity in the presence of different salts at different temperatures. The results of these tests are reported in Table II.

TABLE I

| Copolymer | Monomers, mole % | | | Active Weight, g | | | | | Total Wet Weight, g |
|---|---|---|---|---|---|---|---|---|---|
| | AAM[1] | E$_n$C$_m$MA[2] | AA[3] | NaDS[4] | AAM | AA | E$_n$C$_m$MA | AZO[5] | |
| A | 99.95 | 0.05(a) | 0 | 23.64 | 47.28 | 0 | 0.189 | 2.4 | 236.4 |
| B | 99.90 | 0.10(a) | 0 | 23.64 | 47.28 | 0 | 0.378 | 2.4 | 236.4 |

TABLE I-continued

| Copoly-mer | Monomers, mole % | | | Active Weight, g | | | | | Total Wet Weight, g |
|---|---|---|---|---|---|---|---|---|---|
| | AAM[1] | $E_nC_mMA$[2] | AA[3] | NaDS[4] | AAM | AA | $E_nC_mMA$ | AZO[5] | |
| D | 99.975 | 0.025(b) | 0 | 23.64 | 46.36 | 0 | 0.058 | 2.4 | 236.4 |
| E | 99.925 | 0.075(b) | 0 | 23.64 | 46.36 | 0 | 0.174 | 2.4 | 236.4 |
| F | 99.95 | 0.05(b) | 0 | 23.64 | 46.36 | 0 | 0.116 | 2.4 | 236.4 |
| G | 99.90 | 0.10(b) | 0 | 23.64 | 46.36 | 0 | 0.231 | 2.4 | 236.4 |
| H | 74.80 | 0.20(a) | 25 | 25.0 | 35.48 | 12.77 | 0.772 | 2.4 | 250 |
| I | 74.90 | 0.10(a) | 25 | 25.0 | 36.05 | 12.96 | 0.392 | 2.4 | 250 |
| J | 74.95 | 0.05(a) | 25 | 25.0 | 36.47 | 13.08 | 0.198 | 2.4 | 250 |
| K | 74.95 | 0.05(b) | 25 | 25.0 | 36.45 | 13.10 | 0.130 | 2.4 | 250 |
| L | 74.90 | 0.10(b) | 25 | 25.0 | 36.27 | 13.04 | 0.260 | 2.4 | 250 |
| $C_1$* | 100 | 0 | 0 | 25.0 | 47.28 | 0 | 0 | 2.4 | 250 |
| $C_2$* | 75.0 | 0 | 25 | 25.0 | 36.65 | 13.15 | 0 | 2.4 | 250 |

*Not an example of the invention.
[1]AAM - acrylamide in aqueous solution at concentration of ~50 percent.
[2]$E_nC_mMA$ - alkyl$_m$ poly(oxyethylene)$_n$ methacrylate when n = number of oxyethylene groups and m = number of carbons in alkyl group - (a) m = 20, n = 12 - (b) m = 10, n = 12.
[3]AA - Acrylic acid added as a 48 percent solution in water adjusted to pH of 4.3 with NaOH.
[4]NaDS - Sodium dodecyl sulfate added as a 10 percent solution in water.
[5]AZO - Azobisisobutyronitrile added as a 1 percent solution in t-butanol.

TABLE II

| Sample No. | Copolymer[1] | Solution Viscosity[2], cps at Specified Copolymer Concentrations | | | |
|---|---|---|---|---|---|
| | | 0.2% | 0.3% | 0.4% | 0.5% |
| 1 | D | 8.6 | 4.2 | 76.0 | 125.0 |
| 2 | F | 24.0 | 300.0 | 575.0 | 8,920.0 |
| 3 | E | 325.0 | 640.0 | 2900.0 | 11,000.0 |
| 4 | G | 1075.0 | 3750.0 | 5500.0 | 9,000.0 |
| $C_1$* | $C_1$ | 5.8 | 9.0 | 14.0 | 23.4 |

*Not an example of the invention.
[1]Copolymer as described in Table I.
[2]Brookfield viscosity in centipoise at 25° C. using a Brookfield LVT viscometer operating at 6 rpm. A UL adaptor is employed at viscosities up to 100 cps, a No. 2 spindle is employed at viscosities from 100 to 5000 cps and a No. 3 spindle is employed at viscosities in excess of 5000 cps. Concentration of copolymer is based on solution being tested for viscosity.

TABLE III

| Sample No. | Copolymer[1] | | Solution Viscosity[2], cps at Specified NaCl Concentration | | | | | |
|---|---|---|---|---|---|---|---|---|
| | Type | Conc. % | 0% | 1.0% | 2.0% | 3.0% | 3.5% | 4.0% |
| 5 | A | 0.2 | 6.8 | 7.0 | 8.3 | 9.2 | ND | 10.9 |
| 6 | B | 0.2 | 10.0 | 10.1 | 11.7 | 13.1 | ND | 18.6 |
| $C_2$* | $C_1$ | 0.2 | 5.9 | ND | 5.9 | ND | ND | 5.9 |
| 7 | L | 0.2 | 1000.0 | 9900.0 | 7700.0 | 3700.0 | 3100.0 | ND |
| 8 | I | 0.2 | 1330.0 | 4100.0 | 4100.0 | 2600.0 | 5700.0 | 5100.0 |
| $C_3$* | $C_2$ | 0.2 | 500.0 | 23.1 | 15.2 | 14.0 | ND | 12.0 |

*Not an example of the invention.
[1]Copolymer as described in Table I wherein concentration is based on the solution being tested from viscosity.
[2]Brookfield viscosity as defined in [2] in Table II. NaCl concentration given in percent from 0 to 4% based on the solution being tested for viscosity. ND means not determined.

TABLE IV

| Sample No. | Copolymer[1] | | NaCl[2], % | Shear Rate[3], sec$^{-1}$ | Solution Viscosity[3], cps at the Specified Temperature | | | | |
|---|---|---|---|---|---|---|---|---|---|
| | Type | Conc. % | | | 25° C. | 40° C. | 50° C. | 60° C. | 80° C. |
| 9 | F | 0.5 | 0 | 172.5 | 50.5 | 52.3 | ND | 54.0 | 46.8 |
| 10 | B | 0.5 | 0 | 172.5 | 84.1 | 92.1 | 90.1 | 91.1 | 60.6 |
| $C_4$* | $C_1$ | 0.5 | 0 | 172.5 | 14.2 | 11.1 | 9.8 | 8.2 | 5.5 |
| 11 | I | 0.2 | 2 | 86.2 | 83.8 | 81.8 | ND | 79.5 | 81.2 |
| 12 | K | 0.2 | 2 | 86.2 | 53.7 | 43.6 | ND | 34.5 | 40.0 |
| $C_5$* | $C_2$ | 0.2 | 3 | 86.2 | 8.9 | 6.6 | ND | 4.8 | 3.5 |

*Not an example of this invention.
[1]Copolymer as described in Table I wherein concentration is based on solution being tested for viscosity.
[2]NaCl concentration in percent based on the solution being tested for viscosity.
[3]Shear rate in reciprocal seconds and solution viscosity in centipoise at 25° C. as measured using a Haake Rotovisco having NV-1 spindle.

As evidenced by the data of Table II, the solution viscosities of the hydrophobe association polymers (Sample Nos. 1-4) are significantly greater than the solution viscosity of a control copolymer (Sample No. $C_1$) which is similar to the hydrophobe association polymers except that it contains no amphiphilic monomer. This difference in viscosity increases as shown in Table II, as the concentrations of the polymers are increased.

The data of Table III show that the addition of an electrolyte (NaCl) to the control aqueous solutions (Sample Nos. $C_2$ and $C_3$) either has no effect on viscosity as in Sample No. $C_2$ which contains homopolymer of acrylamide or reduces viscosity as in Sample No. $C_3$ which contains an acrylamide/acrylic acid copolymer. In contrast, the viscosities of aqueous solutions containing the hydrophobe association copolymer are increased by this addition of electrolyte.

As evidenced by the data of Table IV, aqueous solutions of the hydrophobe association polymers (Sample Nos. 9-12) retain a greater percentage of their original viscosities when subjected to higher temperatures than do aqueous solutions containing the control polymers (Sample Nos. $C_4$ and $C_5$).

What is claimed is:

1. An aqueous-soluble hydrophobe associative copolymer of an ethylenically unsaturated, water-soluble monomer having a hydrophobic group, said copolymer thus having hydrophobic groups, derived from said amphiphilic monomer, that are capable of associating with each other in an aqueous medium containing a water-soluble electrolyte thereby causing an increase in the viscosity of the aqueous medium, wherein said copolymer is composed of from about 40 to about 99.9 mole percent of acrylamide, from 0 to about 50 mole percent of acrylic acid and from about 0.1 to about 10 mole percent of higher alkyl poly(oxyethylene)$_x$ methacrylate or acrylate wherein alkyl has from 8 to 16 carbon atoms and x is a number from 5 to 40, said copolymer having a weight average molecular weight in the range from 800,000 to about 3 million as determined from intrinsic viscosity.

2. An aqueous composition comprising an aqueous medium and the copolymer of claim 1 in an amount sufficient to increase the viscosity of the aqueous medium.

3. The aqueous composition of claim 2 comprising the aqueous medium and from about 0.01 to about 1 weight percent of the copolymer and from about 0.01 to about 20 weight percent of an alkali metal salt or an alkaline earth metal salt.

4. The copolymer of claim 1 which is a copolymer of from about 60 to about 99.9 mole percent of acrylamide, from 0 to about 30 mole percent of acrylic acid and from about 0.1 to about 10 weight percent of dodecyl poly(oxyethylene)$_x$ methacrylate wherein x is a number from 10 to 20 and the electrolyte comprises sodium chloride.

5. The copolymer of claim 4 which is a copolymer from about 99 to about 99.5 mole percent of acrylamide and from about 0.5 to about 1 weight percent of dodecyl poly(oxyethylene)$_x$ methacrylate wherein x is a number from 10 to 20.

6. The composition of claim 1 wherein the electrolyte is a salt of a monovalent cation which salt is present in an amount from about 0.1 to about 15 weight percent based on the aqueous composition.

7. The composition of claim 6 wherein the salt is sodium chloride or potassium chloride or a mixture thereof.

8. The composition of claim 1 wherein the electrolyte comprises a salt of a divalent metal which salt is present in an amount from about 0.01 to about 10 weight percent based on the composition.

9. The composition of claim 8 wherein the electrolyte comprises a salt of calcium or magnesium or a mixture of a salt of calcium and a salt of magnesium.

10. The composition of claim 1 which contains from about 0.01 to about 1.5 weight percent of the copolymer.

11. The composition of claim 1 wherein the electrolyte is an acid or a base.

12. A water-soluble copolymer having the formula which comprises

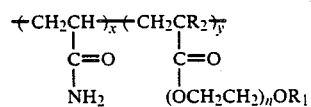

wherein R$_1$ is selected from the group consisting of C$_6$–C$_{20}$ alkyl groups and alkyl aryl wherein alkyl has from 7–10 carbons, R$_2$ is hydrogen or methyl, n is from 2 to 40, y is about 0.1 to about 2 mole percent and x is about 98 to about 99.9 mole percent.

13. The copolymer of claim 12 wherein the copolymer is soluble in water at a concentration level of 0.5 weight part of copolymer per 100 weight parts of water.

14. The copolymer of claim 12 wherein the copolymer is soluble in an aqueous medium at a concentration level of from about 0.05 to about 1 weight percent, said aqueous medium having up to about 5 weight percent of sodium chloride therein.

* * * * *